July 22, 1941.   H. D. KOESTER   2,250,383
AIR CONTROLLED SIEVE FOR THRESHING MACHINES
Filed Oct. 12, 1939   2 Sheets-Sheet 1
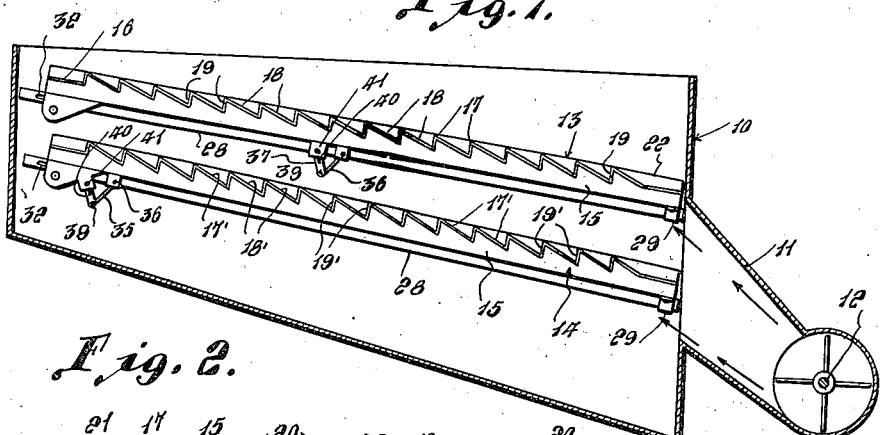
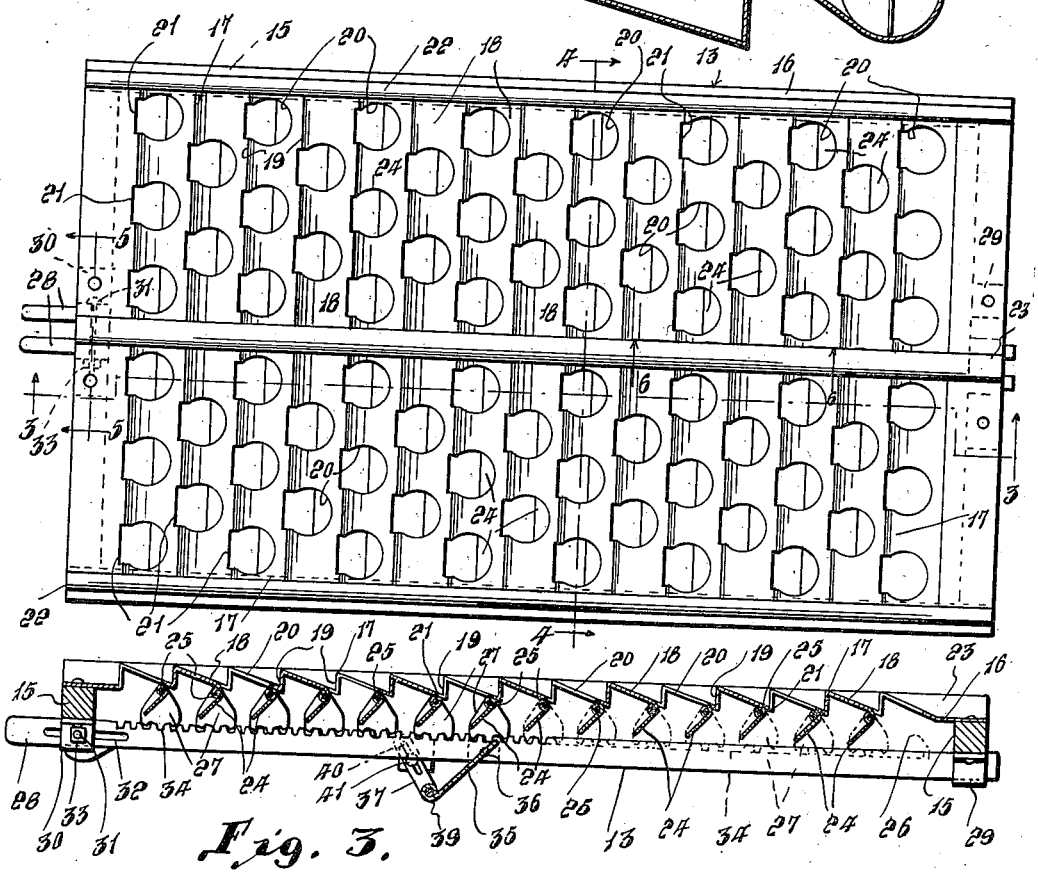
Inventor
Henry D. Koester
By L. F. Randolph
Attorney July 22, 1941.        H. D. KOESTER        2,250,383
AIR CONTROLLED SIEVE FOR THRESHING MACHINES
Filed Oct. 12, 1939        2 Sheets-Sheet 2
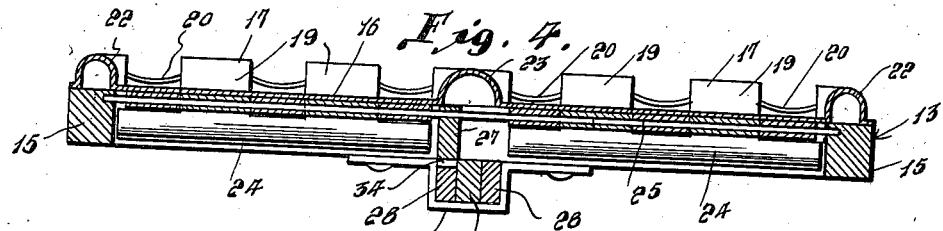
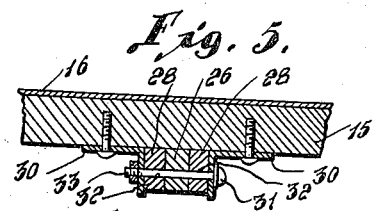
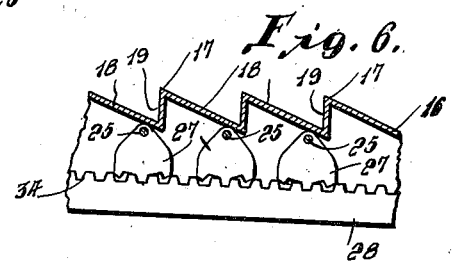
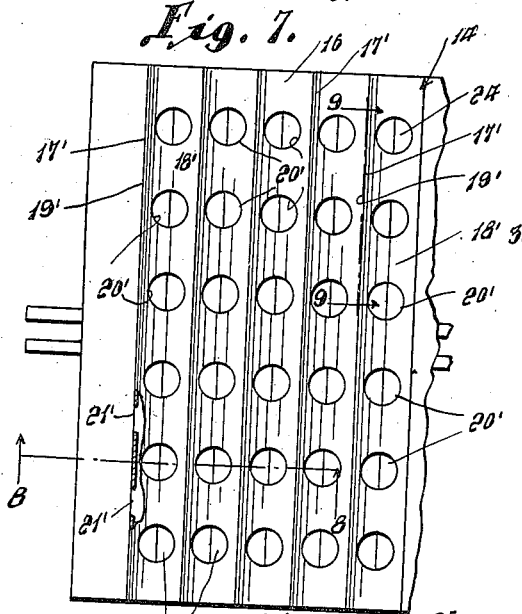
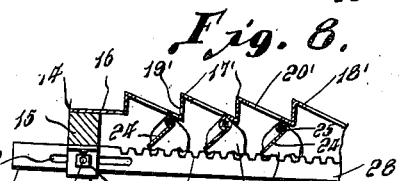
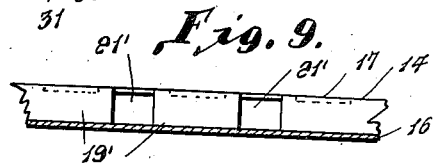
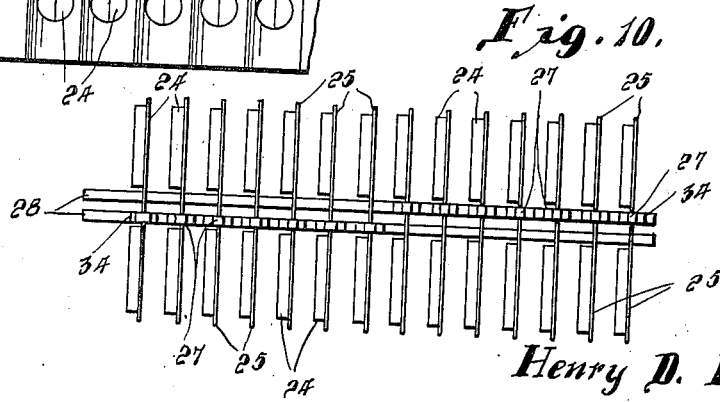
Inventor
Henry D. Koester
By L. F. Randolph
Attorney Patented July 22, 1941

2,250,383

UNITED STATES PATENT OFFICE 2,250,383

AIR CONTROLLED SIEVE FOR THRESHING MACHINES

Henry D. Koester, New Holland, Ill.

Application October 12, 1939, Serial No. 299,192

3 Claims. (Cl. 209—22)

This invention relates to an air controlled sieve for use in harvesters, threshers, combines and the like and a prime object is to provide a novel means to protect the grain from the force of the wind or air current as the grain passes through the sieve.

It is further aimed to provide such a structure having shields to protect all of the holes in a ribbed sieve, a construction wherein dead air cells are formed at the rear of the windshield used, and a construction wherein such windshield may be adjusted to different angles to vary the effect of the air current.

Various additional objects and advantages will become apparent from a consideration of the description following taken in connection with accompanying drawings illustrating an operative embodiment.

In said drawings:

Figure 1 is a view in longitudinal section taken through a harvester grain shoe equipped with my improvements;

Figure 2 is a plan view of one of the sieves;

Figure 3 is a longitudinal sectional view taken on the line 3—3 of Figure 2;

Figure 4 is a cross sectional view taken on the line 4—4 of Figure 2;

Figure 5 is a cross sectional detail taken on the line 5—5 of Figure 2;

Figure 6 is a longitudinal section taken on the line 6—6 of Figure 2;

Figure 7 is a plan view fragmentarily showing a modified form of sieve;

Figure 8 is a longitudinal section taken on the line 8—8 of Figure 7;

Figure 9 is a transverse section taken on the line 9—9 of Figure 7, and

Figure 10 is a plan view of the windshields detached, in combination with the means for adjusting them.

Referring specifically to the drawings, 10 represents a conventional grain shoe of a harvester or the like having a duct 11 at one end in which a fan 12 is operable. Fan 12 is driven in any suitable manner from the harvester and creates wind or air currents which pass into the grain shoe in the direction of the arrows shown in Figure 1, between the two sieves 13 and 14 shown therein, and beneath them. Said sieves 13 and 14 are adapted to be vibrated in the usual or conventional manner.

Each sieve 13 and 14 has an open rectangular frame 15 to the upper surface of which a sieve body 16 is fastened, such body preferably being in a single metallic sheet and it has a series of transverse parallel ribs 17, having smooth inclined surfaces 18 and perpendicular surfaces 19. Openings 20 are preferably provided through the ribs at surfaces 18 and openings 20 are continued to provide rectangular extensions 21 leading to the surfaces or walls 19 beneath the same.

Said sieve bodies 16 also have upstanding integral ribs 22 adjacent their longitudinal margins and parallel therewith and centrally have an upstanding rib 23. Said ribs 22 and 23 are preferably arcuate and convex, as best seen in Figure 4.

Windshields or vanes 24 are rigid on pivot rods or shafts 25, suitably journaled in the side members of frame 15 and a central batten or strip 26 carried by the frame and located beneath the rib 23. Rigid on each shaft 25, is a gear segment 27, some of such segments being on one side of the batten 26 and the remainder being on the other side thereof. Slidable adjusting bars 28 are disposed on opposite sides of the batten 26 and are positioned and guided by a bracket 29 at one end of the frame 15. At the other end of the frame 15, a pair of brackets 30 are fastened thereto and they mount a bolt 31, which passes through the same and batten 26 and elongated slots 32 in the bars 28. Bolt 31 has a nut 33 thereon so that the bars 28 may be rigidly clamped in adjusted position and be released or relieved of pressure for sliding adjustment.

Said adjusting bars 28, along their upper surfaces have gear teeth 34 which are enmeshed with the gear teeth of the adjacent gear segments 27. It will be clear, that through sliding movement of the bars 28, the intermeshed teeth of the same and the segments 27 will rock the shafts 25 and position the shields 24 at any desired angle to vary the effect of the wind or air from fan 12.

Carried by each sieve structure beneath the sieve body 16, is a grain check plate 35, being preferably carried by a rod 36, pivoted to the adjacent bar 28. Links 37, are pivoted at 39 to the lower end of such grain check plate 35 and they have elongated slots 40 through which adjustable bolts 41 pass and which are mounted on the adjacent bars 28. Through the adjustment of the bolts and associated parts, the grain checks 35 may be positioned at various angles.

It will be clear that the chaff and grain passes over the sieve 13 and also the sieve 14, from right to left in Figure 1 and that it passes through one sieve 13 onto the other sieve. The sieve 14, preferably has smaller openings 20 and 21 than those of the upper sieve 13 so that the chaff and grain in a general way, will be progressively sieved as is usual. It is clear that not only grain such as wheat may be sieved, but that the structure operates as well in beans, oats, clover seed and the like.

It will be clear that the shields 24, protect the grain from the air blast of the fan 12 as the grain passes through the openings 20 and 21 of the sieve. Such air shields 24 may be set at any desired angle. Particularly when set at approximately a forty-five degree angle slanting toward the back, the air blast will pass up through the openings 20 causing dead air cells at the rear of the shields and moving the chaff down through the sieve through the openings therein. By adjusting the angle of the shields 24, any amount of air desired is obtained at the openings of the sieve or the hole of the rib. The hole in the rib also acts as a grain catcher. There is just enough air permitted to pass up through the sieve to loosen the chaff and allow the grain to drop into the dead air cells. The chaff that passes through the upper sieve 13 is caught on the lower sieve 14 and the same operation is performed in connection with the smaller openings 20 and 21 thereof. A heavy air current may be directed between the two sieves, thus blowing most of the chaff away before striking the second sieve and without blowing the grain over the sieve.

Attention is called to the fact that one bar 28 controls the shields 24 at one end of the sieve and that the other bar controls the shields at the other end of the sieve. Conditions at the two ends often require different air currents, depending on the weight of the grain. For this reason, the shields 24 at the two ends may be separately adjusted. While each bar is shown as geared to an even number of the shields, it is obvious that the number at one end may be greater than the number at the other and vice versa. In the case of the sieve 14, the wind or air blast passes more directly over the top thereof, giving grain more protection from the wind or air blast.

In Figures 7 to 9, a modified form is shown. In such figures, ribs 17' are employed, the equivalent of those at 17, having similar walls at 18' and 19'. Instead of openings 20 and 21 communicating with each other, they are made separate as at 20' and 21'. Otherwise the structure is similar to that of the preceding form.

It will be clear that the ribs 22 and 23 will prevent the falling of material through the sieve in line with the frame, batten 26 and bars 28.

Various changes may be resorted to provided they fall within the spirit and scope of the invention.

I claim as my invention:

1. A structure of the class described comprising a frame, a perforated sieve body thereon having parallel ribs, shields depending from the ribs to modify the effect of air blasts delivered from below through perforations of the body, oppositely slidable bars disposed beneath the body, shafts beneath the body carrying said shields and journaled on the ribs and the frame, gearing on said shafts driven by said bars, a batten, said bars being on opposite sides of and parallel with and contacting the batten, bracket means on the frame positioning the batten and bars and guiding the latter, and bolt and elongated slot means to adjustably secure the bars in different positions rigid with respect to the batten and bracket means.

2. A structure of the class described comprising a frame, a perforated sieve body thereon having parallel ribs, shields depending from the ribs to modify the effect of air blasts delivered from below through perforations of the body, oppositely slidable bars disposed beneath the body, shafts beneath the body carrying said shields and journaled on the ribs and the frame, gearing between said shafts and said bars, a batten, said bars being on opposite sides of and parallel with and contacting the batten, bracket means on the frame positioning the batten and bars and guiding the latter, said gearing consisting of rack teeth on the bars and gear members secured transversely of the shafts and having teeth engaging the rack teeth, bolts passing through the brackets and said batten, said bars having elongated slots through which said bolts also pass.

3. A structure of the class described comprising a perforated sieve body having ribs, said perforations being relatively large and arranged in rows extending laterally of the sieve, shields depending from the sieve body to modify the effect of air blasts delivered from below through the perforations of the sieve, one of said shields being arranged beneath each row of perforations, means operable to vary the angle of one group of said shields for said modifying effect, and means operable to vary the angle of the remainder of said shields independently of the first mentioned means according to different air current requirements for grain on the sieve body.

HENRY D. KOESTER.